United States Patent [19]

Hope et al.

[11] 4,305,669

[45] Dec. 15, 1981

[54] MIXING APPARATUS

[76] Inventors: Henry F. Hope; Stephen F. Hope, both of 2421 Wyandotte Rd., Willow Grove, Pa. 19090

[21] Appl. No.: 143,266

[22] Filed: Apr. 24, 1980

[51] Int. Cl.$^3$ ............................................. G05D 11/02
[52] U.S. Cl. ....................................... 366/152; 137/87
[58] Field of Search ..................... 366/152, 16, 19, 40; 222/132, 135, 145; 137/87

[56] References Cited

U.S. PATENT DOCUMENTS

| | | | |
|---|---|---|---|
| 2,600,877 | 6/1952 | Jeffree | 299/84 |
| 2,641,271 | 6/1953 | Pressler | 137/87 |
| 2,645,463 | 7/1953 | Stearns | 259/4 |
| 3,442,453 | 5/1969 | Whitehouse | 239/71 |
| 3,779,518 | 12/1973 | Koepke | 366/152 |
| 3,826,113 | 7/1974 | Boraas | 222/135 |

*Primary Examiner*—Edward J. McCarthy
*Attorney, Agent, or Firm*—Zachary T. Wobensmith, 2nd; Zachary T. Wobensmith, III

[57] ABSTRACT

Mixing apparatus is described in which a plurality of chemical materials are to be incorporated in a carrier liquid, which may be a solvent, such as water, and which is quantitatively predominant, some of the chemical materials being incompatible if brought together directly, or in a wrong sequence, or which are difficult to combine, the materials being combined in the desired proportions in a series arrangement of liquid filled rotary motor driven pumps, the respective materials in the desired proportions preferably being supplied from separate sources of materials by reciprocating pumps, the delivery of the carrier liquid being to a first rotary motor driven pump to which a first chemical material is supplied, the first rotary motor driven pump having a fluid connection between its intake and delivery portions for repeated circulation and agitation of the liquid for mixing, with a tap for fluid input of the carrier liquid and first chemical material and a tap for fluid delivery connected to a fluid connection. Additional rotary motor driven pumps are provided for repeated circulation and agitation of the liquid for mixing and each with fluid input taps and delivery connections. The pumps are preferably simultaneously driven from a single power source with shut-off upon exhaustion of one of the materials and with continued operation of the rotary pumps after the reciprocating pumps have been shut-off.

15 Claims, 1 Drawing Figure

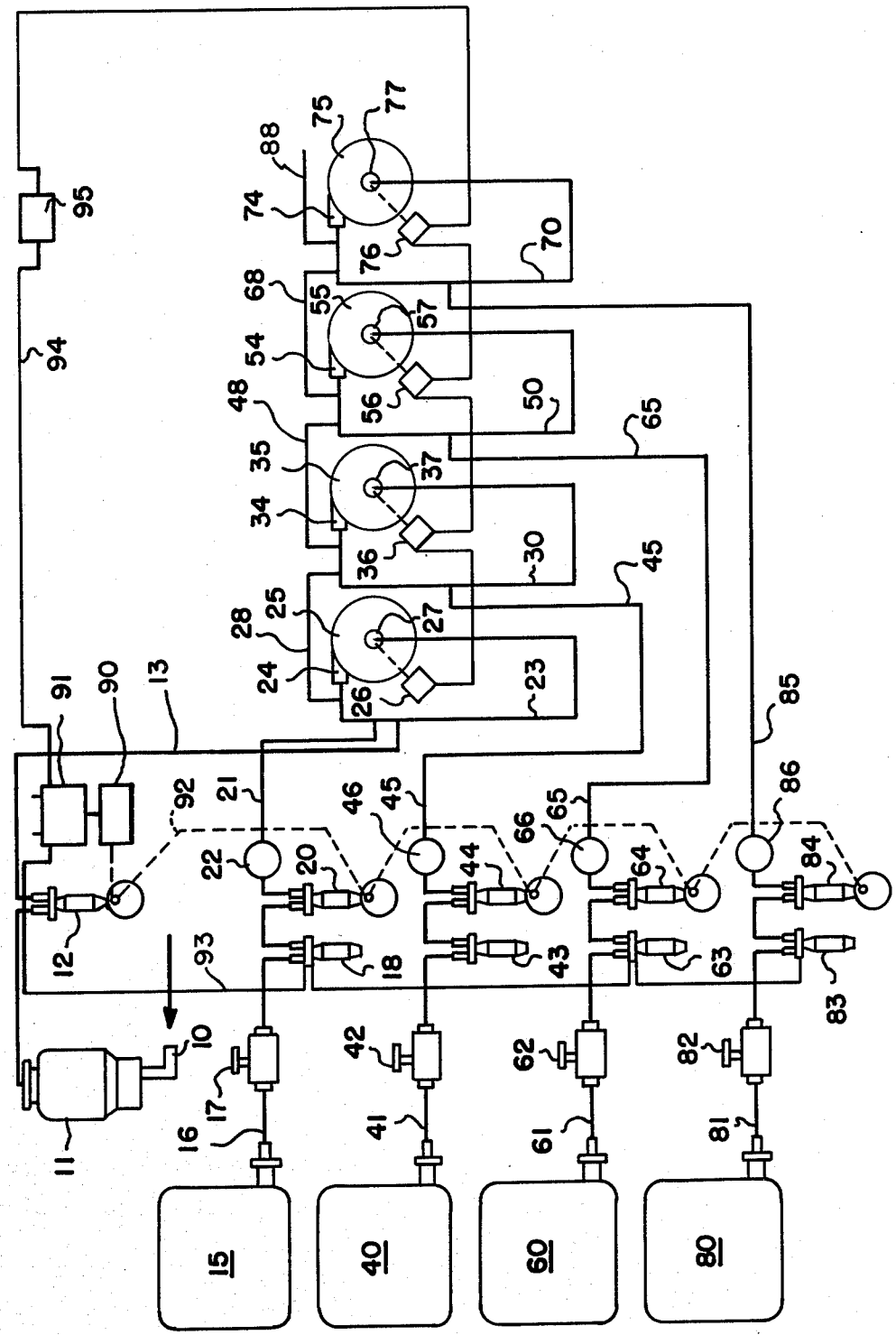

MIXING APPARATUS

BACKGROUND OF THE INVENTION

1. Field of the Invention

This invention relates to mixing apparatus for a plurality of different liquid materials in measured quantities.

2. Description of the Prior Art

It has heretofore been proposed to supply a plurality of fluid components to be combined to a common receiver or supply line. Systems of this type are shown in U.S. Pat. No. 2,641,271 to Pressler, U.S. Pat. No. 3,442,453 to Whitehouse and U.S. Pat. No. 2,600,877 to Jeffree. The systems of Pressler and Whitehouse may involve difficulties if one or more of the chemical materials is incompatible, and the structure required is expensive.

Jeffree has no provisions for positive feeding of measured quantities of additives, no provisions for effective agitation to insure mixing and no control in the event of exhaustion of one of the materials to be added.

Stearns, in U.S. Pat. No. 2,645,463, shows method and apparatus for continuous flow mixing but is silent as to the manner of supplying the fluid through the individual conduits and does not undertake to supply any measured quantities of materials. Careful sizing of the main conduit of Stearns, and the conduit elements with their orifices, would be required to induce turbulent flow of a character to achieve the mixing and homogenization desired by Stearns if in fact it would be achieved. If the quantities to be introduced were very small in proportion to the fluid stream there would be a serious problem as to the effectiveness of these small quantities to produce turbulence at a mixing zone and serious doubt as to the efficiency of the distribution of the material thus added. Stearns also has no provisions for shut-off if a material to be added is exhausted.

SUMMARY OF THE INVENTION

In accordance with the invention mixing apparatus is disclosed for successively adding chemical materials to a carrier liquid, such as water, which may be a solvent and which is the predominant quantitative material and particularly where some of the chemical materials may be incompatible, in a series arrangement of liquid filled rotary motor driven pumps, the carrier and the respective chemical materials being separately supplied in the desired proportions by reciprocating pumps, preferably adjustable as to output, which can be driven from a common power source, the carrier liquid and a first chemical material being delivered to a first rotary motor driven pump having a circulating fluid connection between its intake and delivery portions for repeated circulation and agitation of the liquid for mixing, and downstream taps between the delivery and intake portions of the circulating fluid connection for introduction of the carrier liquid and first chemical material, and an upstream tap for delivery of a corresponding quantity of fluid to that introduced to a downstream tap on a second circulating fluid connection between the intake and delivery portions of a second rotary motor driven pump for repeated circulation and agitation of the liquid for mixing, the second circulating fluid connection for the second motor rotary driven pump having an upstream tap for delivery of fluid to an upstream tap on a third circulating fluid connection between the intake and delivery portions of a third rotary motor driven pump for repeated circulation and agitation of the liquid for mixing, the third circulating fluid connection for the third rotary motor driven pump having a downstream tap for introduction of a third chemical material to be mixed, the third fluid connection having an upstream tap for delivery of liquid to an upstream tap on a fourth circulating fluid connection between the intake and delivery connections of a fourth rotary motor driven pump, for repeated circulation and agitation of the liquid for mixing, the fourth circulating fluid connection having an upstream tap for delivery of the liquid for use, the fourth fluid circulating connection having a downstream tap for introduction of a fourth chemical to be mixed and with controls for shutting off operation when one of the chemical materials to be added is exhausted and for shutting off the rotary motor driven pumps after a predetermined time period if one of the chemical materials to be added is exhausted.

It is the principal object of the invention to provide mixing apparatus for chemical materials to be added to a carrier liquid which is simple in construction, is composed essentially of simple reciprocating and rotary pumps and which can be quickly and easily assembled at low cost.

It is a further object of the invention to provide a mixing system which is simple in construction and constructed of well known components so as to reduce operating problems.

It is a further object of the invention to provide mixing apparatus in which a high degree of fluid agitation is achieved at each of a plurality of stages for intimate mixing of the component materials added.

It is a further object of the invention to provide mixing apparatus which is liquid filled, the addition of materials effecting the advance through the apparatus and the discharge for use.

It is a further object of the invention to provide mixing apparatus in which provisions are made for shutdown in the event of exhaustion of one of the materials to be added.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

The FIGURE is a diagrammatic view of mixing apparatus in accordance with the invention.

It should, of course, be understood that the description and drawings herein are illustrative merely and that various modifications and changes can be made in the structure disclosed without departing from the spirit of the invention.

DESCRIPTION OF THE PREFERRED EMBODIMENT

Referring now more particularly to the drawing, a supply connection 10 for carrier liquid is provided which is preferably connected to a transparent bottle or other suitable receptacle 11 for observing the presence of liquid from the supply connection 10. The nature of the carrier liquid will be determined by the materials to be added and the ultimate use to be made of the liquid mixture. For many purposes the carrier liquid will be water, and will be the predominant constituent for some purposes, but the mixing apparatus is not restricted in its use to this specific liquid. Other carriers, including organic liquids, can be employed.

The receptacle 11 is connected by the supply connection 10 to a pump 12. The pump 12 can be of any desired type for supplying a measured quantity of the carrier liquid. For this purpose a positive displacement bellows pump having an adjustable stroke to determine the measured quantity of liquid will serve for purposes where a measured quantity of a few gallons is provided. While a single pump 12 is illustrated, if desired and if necessary to provide an adequate quantity of the carrier liquid, a plurality of pumps 12 may be employed or a larger pump adequate for the purpose may be employed. The pump 12 has a delivery connection 13.

A first chemical supply reservoir 15 is provided for a first chemical material to be added and mixed which is preferably connected by a fluid connection such as a delivery pipe 16 through a manually operable shut-off valve 17 and control apparatus 18 including a bellows responsive to liquid flow to discontinue mixing if the reservoir 15 is empty. Suitable control apparatus for this purpose is shown in our prior U.S. Pat. No. 4,118,150.

The pipe 16 provides a supply connection for a pump 20. The pump 20 can be of any desired type for supplying a measured quantity of liquid from the reservoir 15. For this purpose a positive displacement bellows pump having an adjustable stroke to determine the quantity of liquid delivered may be employed. The pump 20 is connected by a delivery connection 21 through a non-return or check valve 22 to a first circulating fluid connection 23 which connects a first output or delivery connection 24 of a first rotary pump 25, driven by a motor 26, to the suction connection 27 of the pump 25. The fluid connection 13 is also connected to the circulating fluid connection 23 for introduction of the carrier liquid into that connection.

An upstream tap 28 is provided for delivery of liquid from the first fluid circulating connection 23 to a second circulating fluid connection 30 which connects an output or delivery connection 34 of a second rotary pump 35, driven by a motor 36, to the suction connection 37 of the pump 35.

A second chemical supply reservoir can be provided for a second chemical material to be added and mixed in the pump 35 and its circulating fluid connection 30.

The reservoir 40 is preferably connected by a fluid connection 41, such as a delivery pipe, through a manually operable shut-off valve 42 and control apparatus 43 similar to the control apparatus 18. Liquid in the fluid connection or pipe 41 is supplied to a pump 44 which is preferably similar to the pump 20. The pump 44 has a fluid connection 45, such as a pipe, to a downstream tap on the second circulating fluid connection 30. A non-return or check valve 46 can be provided in the pipe 45.

An upstream tap 48 is provided for delivery of liquid from the second circulating fluid connection 30 to a third circulating fluid connection 50 which connects an output or delivery connection 54 of a third rotary pump 55, driven by a motor 56 to the suction connection 57 of the pump 55.

A third chemical supply reservoir 60 can be provided, if desired, for a third chemical material to be added and mixed in the pump 55 and its circulating fluid connection 50. The reservoir 60 is preferably connected by a fluid connection 61, such as a delivery pipe, through a manually operable shut-off valve 62 and control apparatus 63, similar to the control apparatus 18.

Liquid in the fluid connection or pipe 61 is supplied to a pump 64, which is preferably similar to the pump 20. The pump 64 has a fluid connection or pipe 65 extending to a downstream tap on the third circulating fluid connection 50. A non-return or check valve 66 may be provided in the fluid connection 65.

An upstream tap 68 is provided for delivery of liquid from the third circulating fluid connection 50 to a fourth circulating fluid connection 70 which connects an output or delivery connection 74 of a fourth rotary pump 75, driven by a motor 76 to the suction connection 77 of the pump 75.

A fourth chemical supply reservoir 80 can be provided, if desired, for a fourth chemical material to be added and mixed in the pump 75 and its circulating fluid connection 70.

The reservoir 80 is preferably connected by a fluid connection 81, such as a delivery pipe, through a manually operable shut-off valve 82 and control apparatus 83, similar to the control apparatus 18. Liquid in the fluid connection or pipe 81 is supplied to a pump 84 which is preferably similar to the pump 20. The pump 84 has a fluid connection or pipe 85 extending to a downstream tap on the fourth circulating fluid connection 70. A non-return or check valve 86 may be provided in the fluid connection 85. The fourth circulating fluid connection 70 has an upstream tap 88 for delivery of the mixed liquid for use.

The number of supply reservoirs and associated structure may be increased or decreased, as desired and to accommodate the specific materials to be incorporated into the mixed liquid finally obtained for use.

The pumps 12, 20, 44, 64 and 84 may be driven in any desired manner but it is preferred to provide an electric motor 90 having a motor controller 91 with a shaft 92 shown diagrammatically in broken lines, to simultaneously drive all the pumps.

The liquid presence control elements 18, 43, 63 and 83 are connected by a conductor 93 to the motor controller 91 to stop the motor 90 in the event of exhaustion of the chemical materials in any of the supply reservoirs 15, 40, 60 and 80 to avoid waste of chemicals.

The motors 26, 36, 56 and 76 for the pumps 25, 35, 45 and 75 are preferably connected by an energizing connection 94 from the motor controller 91 through a time delay relay 95 to continue operation of the motor drive pumps 25, 35, 55 and 75 even if other portions of the apparatus have been shut off.

The mode of operation will now be pointed out.

The system preferably operates as a liquid filled system free from gas or air.

The carrier liquid is supplied through the supply connection 10 to the pump 12 and therefrom through the pipe 13 to the first circulating fluid connection 23 and the first rotary pump 25, the pump 12 supplying a measured quantity of carrier liquid. Simultaneously, a measured quantity of the first chemical material to be added from the first supply reservoir 15 is supplied by the pump 18 as determined by its setting, through the delivery connection 21 to the first circulating fluid connection 23.

The carrier liquid is supplied through the pipe 13 and the first chemical material is supplied through the pipe 21 into the first agitating and mixing structure comprising the first rotary pump 25 and the first circulating fluid connection 23 from the pump outlet 24 to the suction connection 26. The rapid and continuous circulation and the turbulent nature of the liquid flow in the absence of air is effective for mixing the respective components.

If the motor 26 is one twentieth of a horsepower, operating at about 2000 rpm., and the pump 25 and connection 23 has a capacity of about one or two quarts the fluid will traverse the essentially closed cycle of pump 25 and connection 23 about 16 times per minute with multitudinous agitating impacts by vanes of the pump 25.

The introduction of measured quantities of the carrier liquid and first chemical material in pulses is effective for displacing the same quantities through tap 28 and into the second circulating fluid connection 30.

In the second, third and fourth cycles, in the second, third and fourth rotary pumps 35, 55 and 75 with their circulating fluid connections 30, 50 and 70 the action previously described is repeated with additional chemical materials being successively supplied through the delivery connections 45, 65 and 85, and with continued displacement and advancement from cycle to cycle by input of additional liquid and with delivery of the mixed liquid through the fluid connection 88 for use.

In the event of exhaustion of any of the materials in the chemical reservoirs 15, 40, 60 and 80 the pumps 20, 44, 65 and 84 will be shut down but the motors 26, 36, 56 and 76 will continue to operate for agitation and mixing for a predetermined time interval determined by the time delay relay 95.

We claim:

1. Mixing apparatus for fluent materials comprising
  a supply connection for a first supply of liquid,
  first mixing means comprising a rotary pump and a first circulating fluid connection connecting the delivery and suction portions of said rotary pump for continuous liquid circulation,
  means for delivering measured quantities of liquid from said first supply connection to said first mixing means,
  a supply connection for a second supply of liquid,
  means for delivering measured quantities of liquid from said second supply connection to said first mixing means, and
  a delivery connection for the liquid from said mixing means,
  the quantities of liquid supplied from said supply connections displacing a comparable quantity of liquid from said first mixing means.

2. Mixing apparatus as defined in claim 1 having in addition
  a supply connection for an additional supply of liquid,
  means for delivering the liquid from said first mixing means to a second mixing means, and
  means for supplying a measured quantity of liquid from said additional supply of liquid to said second mixing means.

3. Mixing apparatus as defined in claim 1 in which said each of said means for delivering a measured quantity of liquid is a pump.

4. Mixing apparatus as defined in claim 3 in which each of said pumps is a motor driven pump.

5. Mixing apparatus as defined in claim 3 in which at least one of said pumps is an adjustable output bellows pump.

6. Mixing apparatus as defined in claim 1 in which both said means for delivering a measured quantity of liquid are driven together.

7. Mixing apparatus as defined in claim 1 in which means is provided interposed between said second supply of liquid and said means for delivering a measured quantity for deactivating said means for delivering upon exhaustion of liquid supplied to said means for delivering.

8. Mixing apparatus as defined in claim 1 in which at least one of said means for delivering said measured quantities of liquid is connected to said circulating fluid connection.

9. Mixing apparatus as defined in claim 1 in which both said means for delivering said measured quantities of liquid are connected to said circulating fluid connection.

10. Mixing apparatus as defined in claim 1 in which said delivery connection is connected to said circulating fluid connection.

11. Mixing apparatus as defined in claim 2 in which said second mixing means comprises a second rotary pump and a second circulating fluid connection connecting the delivery and suction portions of said second rotary pump for continuous liquid circulation for mixing.

12. Mixing apparatus as defined in claim 11 in which said means for supplying a measured quantity of liquid from said additional supply is connected to said second mixing means.

13. Mixing apparatus as defined in claim 11 in which said delivery connection for said first mixing means is connected to the second circulating fluid connection.

14. Mixing apparatus as defined in claim 11 in which means is provided interposed between said second and said additional liquid supply connections and said means for delivering measured quantities for deactivating said means for delivering upon exhaustion of liquid supplied to said means for delivering measured quantities.

15. Mixing apparatus as defined in claim 14 in which control means is provided for continued operation of said first and second rotary pumps for a predetermined time interval upon deactivation of said means for delivering measured quantities.

* * * * *